J. B. SHIRER.
REAMER.
APPLICATION FILED AUG. 23, 1912.

1,063,074.

Patented May 27, 1913.

Witnesses
M. F. Garnett
J. H. Hoster

Inventor
J. B. Shirer
By Victor J. Evans
Attorney

UNITED STATES PATENT OFFICE.

JOHN B. SHIRER, OF CHARLOTTE, NORTH CAROLINA.

REAMER.

1,063,074.

Specification of Letters Patent. Patented May 27, 1913.

Application filed August 23, 1912. Serial No. 716,676.

*To all whom it may concern:*

Be it known that I, JOHN B. SHIRER, a citizen of the United States, residing at Charlotte, in the county of Mecklenburg and State of North Carolina, have invented new and useful Improvements in Reamers, of which the following is a specification.

The invention relates to boring and drilling and more particularly to reamers, and has for an object to provide a reamer for boring and cutting.

The invention embodies, among other features, a reamer having a series of removable cutting blades which, when arranged on the reamer, will present a taper and which can be conveniently removed for the purpose of sharpening the same or substituting new blades therefor.

Figure 1:
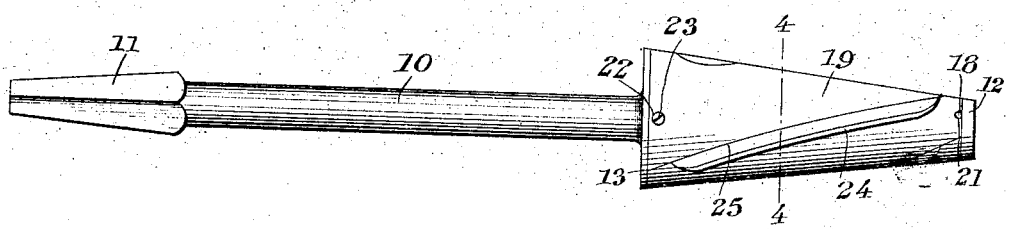
Figure 2:
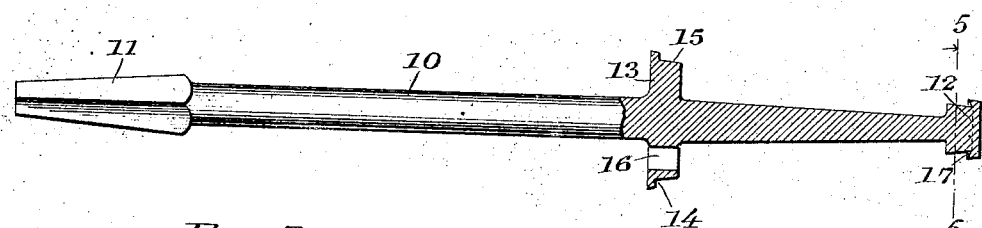
Figure 4:
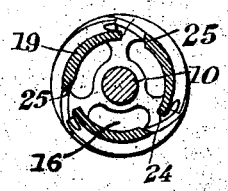
Figure 3:
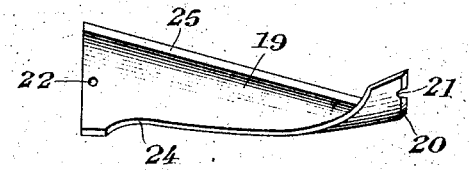

In the further disclosure of the invention reference is to be had to the accompanying drawings constituting a part of this specification, in which similar characters of reference denote corresponding parts in all the views, and in which:

Figure 1 is a side elevation of the reamer showing the cutting blades mounted thereon; Fig. 2 is a vertical longitudinal sectional view of the reamer, the cutting blades having been removed therefrom; Fig. 3 is a perspective view of one of the cutting blades; Fig. 4 is a vertical transverse sectional view taken on the line 4—4 in Fig. 1; and Fig. 5 is a vertical transverse sectional view taken on the line 5—5 in Fig. 2, the blades having been removed to disclose the pins for securing the front ends of the blades to the reamer proper.

Referring more particularly to the views, use is made of a stem 10 having a tapered end 11 adapted to receive a holder or handle, the other end of the said stem terminating in a circular head 12, a circular flange 13 being formed with the stem 10 between the ends thereof, the said flange having a circular reduced portion 14 constituting a seat 15 and provided with an opening 16 constituting an outlet for shavings and the like.

Figure 5:
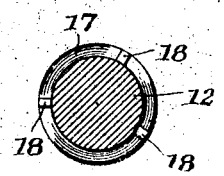

A circular dovetail groove 17 is formed in the head 12 and a series of spaced pins 18 projects from the head 12 immediately adjacent the dovetail groove 17, the said pins being extended at right angles to the longitudinal plane of the stem 10, as shown in Fig. 5.

Blades 19 are adapted for connection with the stem 10 and each preferably consists of a single piece of tempered steel or other material having a cutting edge 20, the forward end of each blade being slightly curved to conform to the dovetail groove 17 and provided with a tapered end 20 adapted to fit into the dovetail groove 17, a notch 21 being provided in each blade at the forward end to receive therein one of the pins 18 on the head 12, the other or rear end of each blade 19 being adapted to repose on and partially encircle the seat 15 and provided with an aperture 22 through which a screw 23 is adapted to pass to secure the rear end of the blade to the flange 13, the front and rear edges of each blade being adapted to abut against the front and rear edges of the next adjacent blade when the said blades are mounted on the stem 10 as shown in Fig. 4, the longitudinal edge of each blade 19, opposite the cutting edge 25 thereof, being cut away to form openings between the blades when the same are mounted on the stem, as is also shown in Fig. 4.

In mounting the blades upon the stem, the first blade is arranged so that the forward tapered end 20 will fit into the dovetail groove 17 of the head 12, one of the pins 18 of the head being received in the notch 21 of the blade, the rear end of the blade being adapted to repose on the seat 15 and secured thereto by the screw 23 passed through the aperture 22 in the blade and extending into the flange 13 as mentioned heretofore. The next blade is then mounted in position on the stem in the same manner and by referring to Fig. 1 it will be seen that the front and rear portions of the next blade will abut against the front and rear projecting portions of the first blade, the cutting away of the longitudinal edge 24 being adapted to provide an opening between the blades as shown. It will be further seen that when all of the blades are mounted upon the stem 10 in the manner mentioned, the blades being primarily connected to the head 12 and flange 13, the said blades will present a tapered surface, the head 12 being of a smaller diameter than the flange 13, as will be readily understood. By providing the longitudinally extending openings between the blades, any shavings can pass between the blades and will not tend to bind the reamer when the same is in operation and the shavings will then pass outwardly through the opening 16 formed in the flange 13 as shown.

The reamer described is operated in the usual manner and is particularly adaptable for use in forming draft openings in patterns for use in foundry work and the like. It will be understood that I do not limit myself to the particular use of the reamer as mentioned above and that the same can be used for various purposes and, if desirable, slightly altered to suit such purposes, it being understood, however, that the scope of the invention is defined by the appended claims. By referring to Fig. 3 it will be seen that the back edge of each blade is preferably a trifle lower than the front cutting edge, thus providing sufficient clearance so that the cutting edge can readily grip the material and perform the desired result. As mentioned heretofore, however, it will be understood that the blades can be bent in any desired manner in order that the same may efficiently perform the object for which they are intended and enable the cutting edges of the blades to operate in the material that is to be reamed without interference by the remaining portions of the blades.

Having thus described my invention, I claim:

1. In a reamer, the combination with a stem, of a head formed at one end thereof, a flange formed on the stem between the ends thereof, a plurality of blades for removable connection with the said head and said flange, pins on the said head and extending into notches formed in the forward ends of the said blades, and means for engagement with the rear ends of the said blades and the said flange for securing the said blades in rigid position thereon.

2. In a reamer, the combination with a stem, of a head formed at one end thereof and provided with a dovetail groove, a flange formed on the said head, a seat on the said flange, blades for engagement with the said head and the said flange, the forward ends of the said blades being tapered for reception in the said dovetail groove, and means for securing the rear ends of the said blades to the said flange.

3. In a reamer, the combination with a stem, of a head formed at one end thereof and provided with a dovetail groove, a flange formed on the said head, a seat on the said flange, blades for engagement with the said head and the said flange, the forward ends of the said blades being tapered for reception in the said dovetail groove, means for securing the rear ends of the said blades to the said flange, and pins projecting from the said head and received in notches formed in the forward ends of the said blades.

4. In a reamer, the combination with a stem, of a head formed therewith, a flange formed with the stem and provided with an opening, and blades for removable engagement with the said head and said flange, the said blades having portions thereof cut away to form openings between the blades with the forward and rear ends of one blade engaging the forward and rear ends of the next blade.

In testimony whereof I affix my signature in presence of two witnesses.

JOHN B. SHIRER.

Witnesses:
W. E. CHAMBERS,
ARMAND DER. MYERS.